United States Patent
Baysinger et al.

(10) Patent No.: US 10,903,677 B2
(45) Date of Patent: Jan. 26, 2021

(54) PRIORITIZING AN INDUCTIVE CHARGING OF EACH DEVICE OF MULTIPLE DEVICES BASED ON POWER PREFERENCES

(71) Applicant: INTERNATIONAL BUSINESS MACHINES CORPORATION, Armonk, NY (US)

(72) Inventors: Bryan L. Baysinger, Atlanta, GA (US); Shikhar Kwatra, Morrisville, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 179 days.

(21) Appl. No.: 16/049,959

(22) Filed: Jul. 31, 2018

(65) Prior Publication Data
US 2020/0044474 A1    Feb. 6, 2020

(51) Int. Cl.
*H02J 50/10*    (2016.01)
*H02J 7/02*    (2016.01)
*H02J 50/00*    (2016.01)
*H02J 50/40*    (2016.01)
*H02J 50/80*    (2016.01)
*G06F 1/26*    (2006.01)

(52) U.S. Cl.
CPC ............. *H02J 7/025* (2013.01); *H02J 50/00* (2016.02); *H02J 50/10* (2016.02); *H02J 50/40* (2016.02); *H02J 50/80* (2016.02); *G06F 1/26* (2013.01)

(58) Field of Classification Search
CPC .. H02J 7/025; H02J 50/80; H02J 50/40; H02J 50/00; H02J 50/10
USPC ........................................... 320/108; 307/104
See application file for complete search history.

(56) References Cited

U.S. PATENT DOCUMENTS

| | | | | |
|---|---|---|---|---|
| 5,656,917 | A | 8/1997 | Theobald | |
| 6,861,956 | B2 * | 3/2005 | Ying | H01H 61/02 340/12.52 |
| 7,274,168 | B2 | 9/2007 | Tskukamoto et al. | |
| 7,615,879 | B2 * | 11/2009 | Przywecki | B60R 16/03 290/400 |
| 7,786,419 | B2 * | 8/2010 | Hyde | H02J 50/40 250/201.1 |
| 8,159,364 | B2 * | 4/2012 | Zeine | H02J 7/025 340/693.1 |
| 8,169,185 | B2 | 5/2012 | Partovi et al. | |
| 8,264,101 | B2 * | 9/2012 | Hyde | H02J 50/10 307/80 |

(Continued)

OTHER PUBLICATIONS

Tseng et al., "Introduction to the Alliance for Wireless Power Loosely-Coupled Wireless Power Transfer System Specification Version 1.0," IEEE Wireless Power Transfer Conference 2013, Technologies, Systems and Applications, May 15-16, 2013 (6 pages).

(Continued)

*Primary Examiner* — Robert Grant
*Assistant Examiner* — John T Trischler
(74) *Attorney, Agent, or Firm* — Griffiths & Seaton PLLC (57) ABSTRACT

Inductive charging of multiple devices includes prioritizing one or more of the devices for receiving a power charge via a wireless charging device according to one or more power charging parameters. A selected amount of the power charge may be provided to the one or more prioritized devices, via the wireless charging device, according to the one or more power charging parameters.

20 Claims, 8 Drawing Sheets

(56) References Cited

U.S. PATENT DOCUMENTS

| | | | | |
|---|---|---|---|---|
| 8,299,652 B2* | 10/2012 | Sample | H02J 5/005 | 307/104 |
| 8,410,953 B2* | 4/2013 | Zeine | H02J 50/27 | 340/693.1 |
| 8,446,045 B2* | 5/2013 | Smith | H02J 50/12 | 307/104 |
| 8,461,800 B2* | 6/2013 | Kozakai | H02J 7/0042 | 320/108 |
| 8,558,661 B2* | 10/2013 | Zeine | H02J 50/80 | 340/5.1 |
| 8,629,654 B2* | 1/2014 | Partovi | H01F 27/2804 | 320/108 |
| 8,686,685 B2* | 4/2014 | Moshfeghi | H02J 50/20 | 320/108 |
| 8,766,592 B2* | 7/2014 | Fujita | H02J 7/0027 | 320/108 |
| 8,766,594 B2* | 7/2014 | Gotz | B60L 53/305 | 320/109 |
| 8,854,176 B2* | 10/2014 | Zeine | H02J 50/80 | 340/5.1 |
| 8,947,047 B2* | 2/2015 | Partovi | H01F 27/2804 | 320/108 |
| 8,970,180 B2* | 3/2015 | Li | H02J 7/0027 | 320/155 |
| 9,035,601 B2* | 5/2015 | Kim | H02J 7/025 | 320/108 |
| 9,077,188 B2* | 7/2015 | Moshfeghi | H02J 50/15 | |
| 9,088,171 B2 | 7/2015 | Won et al. | | |
| 9,142,973 B2* | 9/2015 | Zeine | H02J 50/27 | |
| 9,190,851 B2* | 11/2015 | Kim | H02J 50/12 | |
| 9,190,858 B2* | 11/2015 | Baarman | H02J 5/005 | |
| 9,231,412 B2 | 1/2016 | Lisi et al. | | |
| 9,276,437 B2* | 3/2016 | Partovi | H02J 50/80 | |
| 9,306,419 B2* | 4/2016 | Qian | H02J 7/025 | |
| 9,407,111 B2* | 8/2016 | Moshfeghi | H02J 50/10 | |
| 9,444,270 B2* | 9/2016 | Stevens | H02J 7/0013 | |
| 9,444,283 B2* | 9/2016 | Son | H02J 1/14 | |
| 9,461,478 B2* | 10/2016 | Smith | H02J 5/005 | |
| 9,473,209 B2* | 10/2016 | Cooper | H02J 5/005 | |
| 9,490,650 B2* | 11/2016 | Stevens | H02J 7/025 | |
| 9,590,444 B2* | 3/2017 | Walley | H02J 7/025 | |
| 9,601,943 B2* | 3/2017 | Partovi | H02J 50/40 | |
| 9,608,472 B2* | 3/2017 | Moshfeghi | H02J 50/20 | |
| 9,692,250 B2* | 6/2017 | Priev | H02J 50/80 | |
| 9,705,352 B2* | 7/2017 | Hur | H02J 7/025 | |
| 9,722,670 B2* | 8/2017 | Won | H02J 50/40 | |
| 9,728,980 B2* | 8/2017 | Jung | H02J 50/60 | |
| 9,735,583 B2* | 8/2017 | van Wageningen | H02J 7/02 | |
| 9,749,017 B2* | 8/2017 | Moshfeghi | H04B 7/0617 | |
| 9,762,079 B2* | 9/2017 | Byun | H02J 50/40 | |
| 9,762,082 B2* | 9/2017 | Park | H02J 5/005 | |
| 9,806,555 B2* | 10/2017 | Li | H02J 7/025 | |
| 9,847,670 B2* | 12/2017 | Moshfeghi | H02J 50/20 | |
| 9,876,379 B1* | 1/2018 | Leabman | H02J 50/80 | |
| 9,882,427 B2 | 1/2018 | Leabman et al. | | |
| 9,949,219 B2* | 4/2018 | Belogolovy | H02J 50/23 | |
| 10,000,134 B2* | 6/2018 | Zhang | B60L 11/1829 | |
| 10,008,887 B2* | 6/2018 | Zeine | H02J 7/0029 | |
| 10,014,726 B2* | 7/2018 | Moshfeghi | H02J 50/90 | |
| 10,014,731 B2* | 7/2018 | Moshfeghi | H02J 50/20 | |
| 10,044,229 B2* | 8/2018 | Partovi | H01F 38/14 | |
| 10,044,231 B1* | 8/2018 | Moshfeghi | H02J 7/025 | |
| 10,141,785 B2* | 11/2018 | Son | H02J 50/60 | |
| 10,158,244 B2* | 12/2018 | Pinciuc | H02J 7/025 | |
| 10,199,854 B2* | 2/2019 | Zeine | H02J 50/40 | |
| 10,230,252 B2* | 3/2019 | Noor | H02J 7/00036 | |
| 10,263,474 B2* | 4/2019 | Moshfeghi | H02J 50/20 | |
| 10,305,294 B2* | 5/2019 | Akbulut | G06F 1/266 | |
| 10,321,523 B2* | 6/2019 | Nam | H05B 6/1218 | |
| 10,396,602 B2* | 8/2019 | Zeine | H02J 7/0021 | |
| 10,483,783 B2* | 11/2019 | Hong | H02J 7/0013 | |
| 10,566,846 B2* | 2/2020 | Zeine | H02J 7/025 | |
| 10,588,180 B2* | 3/2020 | Nam | H05B 6/1218 | |
| 2003/0011486 A1* | 1/2003 | Ying | H01H 61/02 | 340/12.52 |
| 2005/0017673 A1 | 1/2005 | Tsukamoto et al. | | |
| 2007/0141999 A1* | 6/2007 | Przywecki | B60R 16/03 | 455/82 |
| 2008/0178032 A1* | 7/2008 | Walrath | G06F 1/3287 | 713/340 |
| 2009/0088144 A1* | 4/2009 | Beadle | H04L 67/24 | 455/419 |
| 2009/0096413 A1* | 4/2009 | Partovi | H01F 5/003 | 320/108 |
| 2010/0045114 A1* | 2/2010 | Sample | H02J 50/12 | 307/104 |
| 2010/0052811 A1* | 3/2010 | Smith | H02J 50/12 | 333/33 |
| 2010/0079005 A1* | 4/2010 | Hyde | H02J 50/80 | 307/104 |
| 2010/0079011 A1* | 4/2010 | Hyde | H02J 50/30 | 307/149 |
| 2010/0081379 A1* | 4/2010 | Cooper | H01Q 1/248 | 455/41.1 |
| 2010/0171461 A1* | 7/2010 | Baarman | H02J 50/12 | 320/108 |
| 2010/0187913 A1* | 7/2010 | Smith | H02J 5/005 | 307/104 |
| 2010/0253281 A1* | 10/2010 | Li | H02J 7/0027 | 320/108 |
| 2010/0315045 A1* | 12/2010 | Zeine | H02J 7/025 | 320/137 |
| 2011/0006603 A1* | 1/2011 | Robinson | H02J 7/0021 | 307/31 |
| 2011/0127845 A1* | 6/2011 | Walley | H02J 7/025 | 307/104 |
| 2011/0156640 A1* | 6/2011 | Moshfeghi | H02J 50/20 | 320/108 |
| 2011/0221391 A1* | 9/2011 | Won | H01M 10/44 | 320/108 |
| 2011/0234156 A1* | 9/2011 | Fujita | H02J 7/0027 | 320/108 |
| 2011/0298297 A1* | 12/2011 | van Wageningen | H02J 50/40 | 307/104 |
| 2012/0056583 A1* | 3/2012 | Gotz | B60L 53/305 | 320/109 |
| 2012/0080957 A1* | 4/2012 | Cooper | H02J 5/005 | 307/104 |
| 2012/0169137 A1* | 7/2012 | Lisi | H02J 5/005 | 307/104 |
| 2012/0193999 A1* | 8/2012 | Zeine | H02J 50/27 | 307/104 |
| 2012/0256585 A1* | 10/2012 | Partovi | H02J 7/0044 | 320/108 |
| 2012/0280650 A1* | 11/2012 | Kim | H02J 50/40 | 320/108 |
| 2012/0293011 A1* | 11/2012 | Byun | H02J 50/12 | 307/104 |
| 2012/0326658 A1* | 12/2012 | Kim | H02J 7/025 | 320/108 |
| 2013/0057080 A1* | 3/2013 | Smith | H02J 5/005 | 307/104 |
| 2013/0175983 A1* | 7/2013 | Partovi | H02J 7/025 | 320/108 |
| 2013/0207604 A1* | 8/2013 | Zeine | H02J 50/40 | 320/108 |
| 2013/0221915 A1* | 8/2013 | Son | H02J 50/12 | 320/108 |
| 2013/0241474 A1* | 9/2013 | Moshfeghi | H02J 50/15 | 320/108 |
| 2014/0035379 A1* | 2/2014 | Stevens | H02J 7/0013 | 307/104 |
| 2014/0035380 A1* | 2/2014 | Stevens | H02J 7/025 | 307/104 |
| 2014/0035524 A1* | 2/2014 | Zeine | H02J 7/0029 | 320/108 |
| 2014/0117946 A1* | 5/2014 | Muller | B60L 53/00 | 320/162 |

(56) References Cited

U.S. PATENT DOCUMENTS

| | | | |
|---|---|---|---|
| 2014/0183962 A1* | 7/2014 | Qian | H02J 7/025 307/104 |
| 2014/0203758 A1* | 7/2014 | Moshfeghi | H02J 50/20 320/103 |
| 2015/0022022 A1* | 1/2015 | Zeine | H02J 50/70 307/104 |
| 2015/0123496 A1* | 5/2015 | Leabman | H02J 7/025 307/151 |
| 2015/0145475 A1* | 5/2015 | Partovi | H01F 5/003 320/108 |
| 2015/0155718 A1* | 6/2015 | Jung | H02J 7/025 307/104 |
| 2015/0171931 A1* | 6/2015 | Won | H02J 50/12 320/108 |
| 2015/0207543 A1* | 7/2015 | Cooper | H02J 5/005 307/104 |
| 2015/0263548 A1* | 9/2015 | Cooper | H02J 7/0021 320/108 |
| 2015/0326063 A1* | 11/2015 | Leabman | H02J 50/10 320/108 |
| 2015/0380971 A1* | 12/2015 | Priev | H02J 50/80 320/108 |
| 2016/0006291 A1* | 1/2016 | Li | H02J 7/025 320/108 |
| 2016/0013685 A1* | 1/2016 | Zeine | H02J 7/0029 320/108 |
| 2016/0028251 A1* | 1/2016 | Hur | H02J 7/0013 320/162 |
| 2016/0181860 A1* | 6/2016 | Partovi | H01F 5/003 320/108 |
| 2016/0336804 A1* | 11/2016 | Son | H02J 7/0027 |
| 2017/0033587 A1 | 2/2017 | Hong et al. | |
| 2017/0047968 A1* | 2/2017 | Moshfeghi | H04B 7/0617 |
| 2017/0093199 A1* | 3/2017 | Pinciuc | H02J 50/10 |
| 2017/0098941 A1* | 4/2017 | Akbulut | B60L 53/00 |
| 2017/0179771 A1* | 6/2017 | Leabman | H02J 50/60 |
| 2017/0181110 A1 | 6/2017 | Belogolovy | |
| 2017/0194809 A1* | 7/2017 | Partovi | H02J 7/00 |
| 2017/0232954 A1* | 8/2017 | Books | B60W 20/40 701/22 |
| 2017/0274788 A1* | 9/2017 | Zhang | B60L 11/1829 |
| 2017/0280513 A1* | 9/2017 | Nam | H02J 50/10 |
| 2017/0358959 A1* | 12/2017 | Zeine | H02J 7/025 |
| 2017/0373522 A1* | 12/2017 | Pelosi | H04B 5/0031 |
| 2018/0241255 A1* | 8/2018 | Leabman | H04B 1/04 |
| 2018/0310367 A1* | 10/2018 | Nam | H02J 50/10 |
| 2018/0310368 A1* | 10/2018 | Nam | H02J 50/10 |
| 2019/0027970 A1* | 1/2019 | Kawamae | H02J 7/025 |
| 2019/0123591 A1* | 4/2019 | Azam | H02J 7/025 |
| 2019/0250689 A1* | 8/2019 | Ivanov | H02J 7/025 |
| 2019/0386521 A1* | 12/2019 | Zeine | H02J 50/27 |
| 2020/0006988 A1* | 1/2020 | Leabman | H02J 50/80 |
| 2020/0042068 A1* | 2/2020 | Rong | G06F 1/3209 |

OTHER PUBLICATIONS

Yin et al., "Autonomous Power Control in a Reconfigurable 6.78 Megahertz Multiple-receiver Wireless Charging System," IEEE Transactions on Industrial Electronics, 2017 (11 pages).

Lu et al., "Wireless Charging Technologies: Fundamentals, Standards, and Network Applications," IEEE Communications Surveys and Tutorials, Nov. 14, 2015 (40 pages).

* cited by examiner

PRIORITIZING AN INDUCTIVE CHARGING OF EACH DEVICE OF MULTIPLE DEVICES BASED ON POWER PREFERENCES

BACKGROUND OF THE INVENTION

Field of the Invention

The present invention relates in general to computing systems, and more particularly, to various embodiments for intelligent inductive charging of multiple devices based on power preferences in a computing environment using a computing processor.

Description of the Related Art

In today's society, consumers, business persons, educators, and others use various computing network systems with increasing frequency in a variety of settings. The advent of computers and networking technologies have made possible the increase in the quality of life while enhancing day-to-day activities. Computing systems can include wireless communication devices (e.g., smart phones) and also include an Internet of Things (IoT), which is the interconnection of computing devices scattered across the globe using the existing Internet infrastructure. IoT devices may be embedded in a variety of physical devices or products. In recent years, there has been a proliferation of computing devices such as, for example, smart phones or IoT devices that utilize power provided by a battery. For example, many people own or purchase various portable devices such as cell phones, music players, video players, and laptops, among other devices.

SUMMARY OF THE INVENTION

Various embodiments are provided herein for intelligent inductive charging of multiple devices based on power preferences in a computing environment by a processor. In one embodiment, by way of example only, a method for intelligent inductive charging of multiple devices based on power preferences in an Internet of Things (IoT) computing environment, again by a processor, is provided. One or more devices (e.g., IoT devices) may be prioritized for receiving a power charge via a wireless charging device according to one or more power charging parameters. A selected amount of the power charge may be provided to the one or more prioritized devices, via the wireless charging device, according to the one or more power charging parameters.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As a preliminary matter, battery charging devices that are included within electronics devices (e.g., mobile phones and laptop computers) provide a fixed voltage source to recharge batteries. The required voltage and current profile for charging the battery is, in general, provided by electronic circuits, either within the charging device itself or within the battery. This allows flexibility in the choice of chargers and also serves to protect the device from potential damage from the use of inappropriate chargers.

Many computing/electronic devices may use wireless battery charging devices for charging a battery. Most wireless mobile charging solutions rely on inductive coupling. With inductive coupling, a charging station takes the form of a mat (e.g., surface) or other flat surface. Inside the mat are one or more inductive coupling coils. The mat itself is connected to an external source of power that is used to recharge the battery. The mat provides the electricity the coils need to generate a charging magnetic field. In some instances, a special case or attachment may be connected to the electronics device to take advantage of this magnetic field and may have matching coil for the inductor coils. The electronics device may be placed on the charging surface such that the coils overlap. The inductor coils inside the mat generates the magnetic field, which induces a flow of electricity inside the matching coil. This electricity then recharges the battery of the electronics device.

However, a major challenge arises when a user wishes to prioritize amperage or charging on a computing device while lessening the amperage or charging on another device based on multiple devices on a surface initiated for the wireless charging. Thus, a need exists for inductive charging multiple devices based on power preferences. In one embodiment, by way of example only, the present invention provides for inductive charging multiple devices in an Internet of Things (IoT) computing environment. One or more devices may be prioritized for receiving a power charge via a wireless charging device according to one or more power charging parameters. A selected amount of the power charge may be provided to the one or more prioritized devices, via the wireless charging device, according to the one or more power charging parameters.

To further illustrate the various embodiments of the present invention, consider the following scenario in which a smart phone is a priority computing device and the smart phone has entered into low power mode and needs a fast, high amperage charge. The charging device (e.g., a wireless charging table/station with inductive coils prepared for wireless charging) may already have additional devices prepared to receive wireless charging and/or a universal serial bus ("USB") battery pack also prepared to receive wireless charging. Both devices, the watch and the battery pack, may not be a priority but take available "bandwidth" of amperage designed for the wireless charging table/station.

Thus, the present invention may use a micro-controller to ascertain the available battery life on a device through embodiments such as, for example, a pressure sensor and/or a radio frequency identification ("RFID") tag system. The micro-controller may determine and/or provide a priority charge and eliminate or reduce a power charge from non-priority devices in order to maximize the amperage to a prioritized device. The inductive coil may turn-off and switch as needed, based on prioritization, and provides for publicly available charging stations that may prioritize charging. Similarly, one or more home applications that are limited such as, for example, to 2.1 amps or 0.5 amps may route such power to a device that demonstrates a greater need for power charge as compared to other devices. Additional benefits or prioritization include the ability to decrease coil power or otherwise charge power to devices that are experiencing thermal indicators such as overheating or surging and devices that are experiencing warning errors as it relates to the battery. Thus, the present invention provides a cognitive element in that an application layer that can support the micro-controller in designating priority based upon a user-defined settings, manufacturer settings, warning indicators, or by user preference in device usage.

In one aspect, mechanisms of the illustrated embodiments provide priority-based routing of controlled amperage to one or more respective devices in order to enable prioritized charging of the one or more respective devices. The dynamic priority may be determined and/or configured in a centralized controller and may depend upon a user's specific device power requirement, usage and battery life. The present invention provides providing prioritized charging of power of a computing device (e.g., smart phone, tablet, computer, IoT device, etc.) based upon smart usage of power and energy savings. An available or selected amount of amperage may be routed or directed to prioritized devices such as, for example, in a public setting with a multitude of charging applications to prevent circuit overload.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
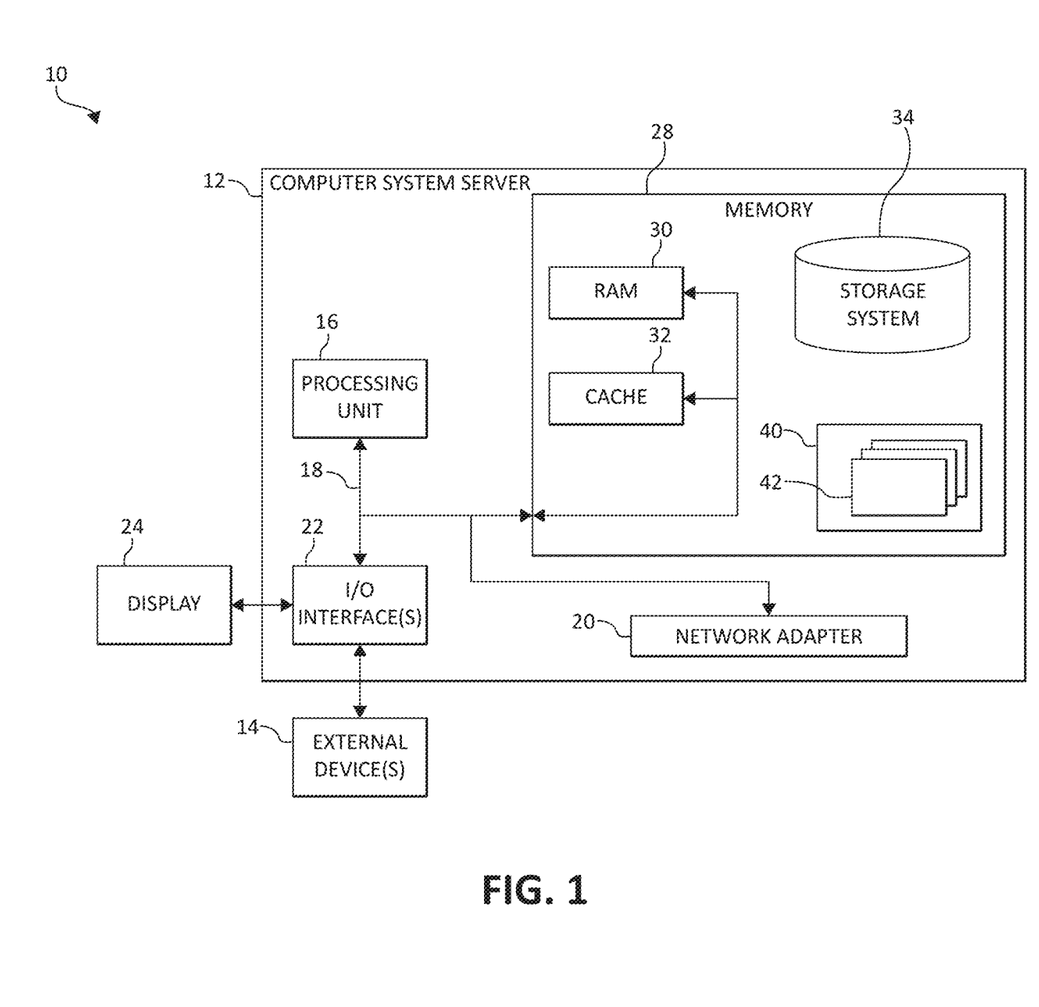
FIG. 1 is a block diagram depicting an exemplary cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
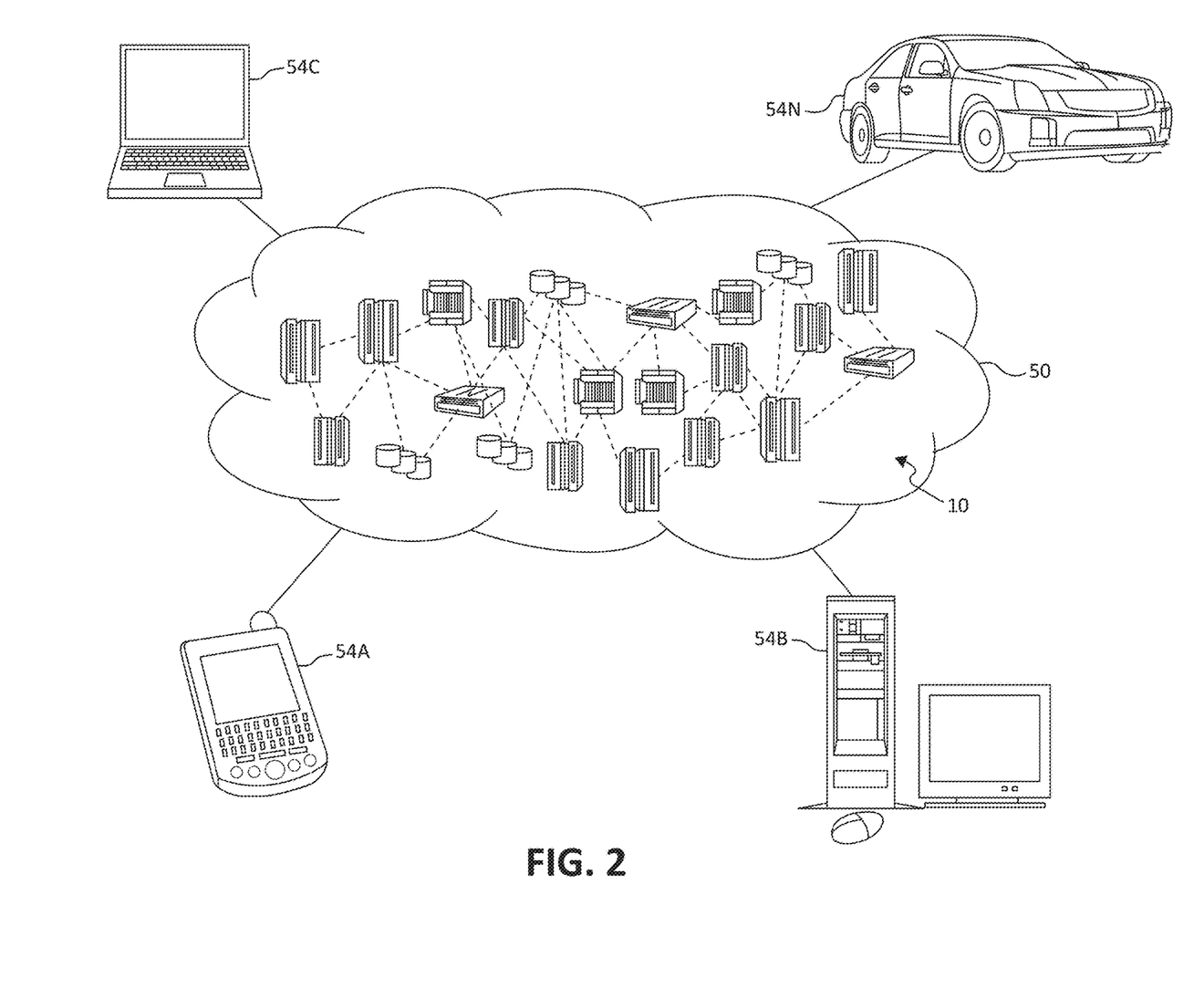
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
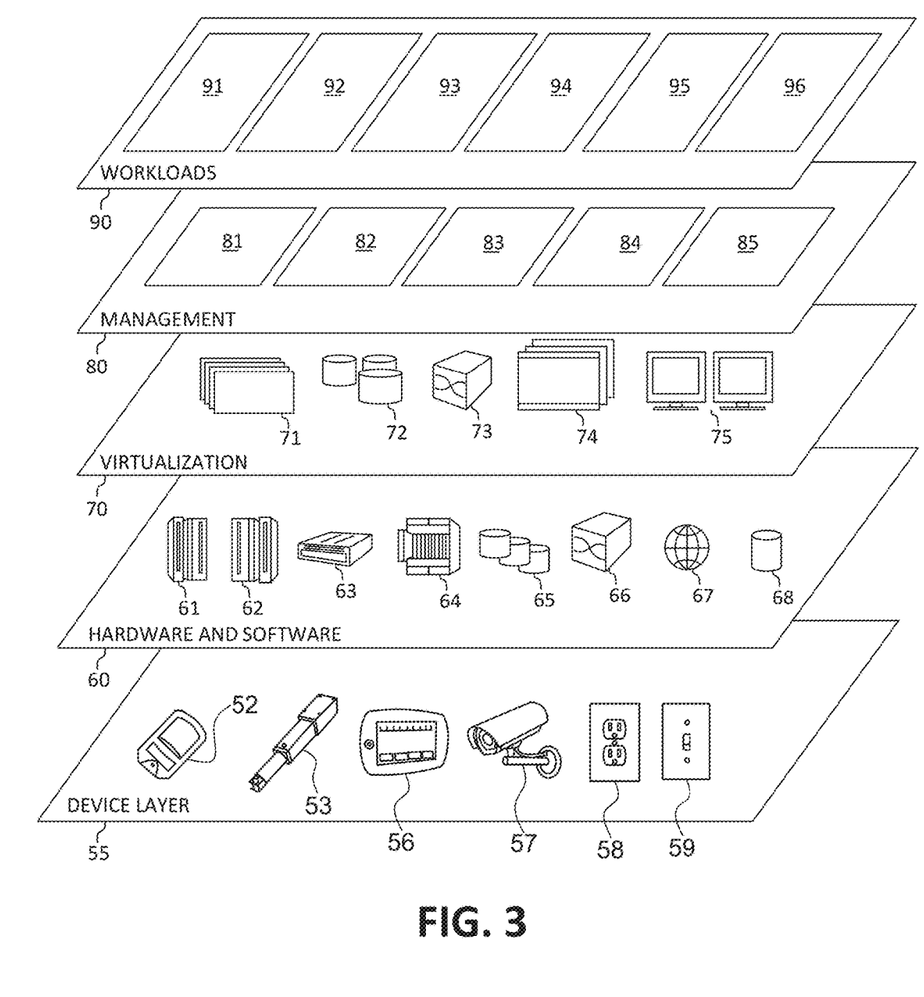
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for intelligent inductive charging of multiple devices. In addition, workloads and functions 96 for inductive charging multiple devices based on power preferences may include such operations as data analysis, machine learning (e.g., artificial intelligence, natural language processing, etc.), user analysis, and power distribution/re-routing, as will be further described. One of ordinary skill in the art will appreciate that the workloads and functions 96 for intelligent inductive charging of multiple devices may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the mechanisms of the illustrated embodiments provide a novel approach for intelligent inductive charging of multiple devices based on power preferences. In one aspect, one or more power charging parameters may be cognitively evaluated, learned, and determined. The one or more power charging parameters may be a pattern history of a user, usage history of each device, user behavior, power consumption of each device, power requirements of each device, interaction between one or more users, one or more environmental factors, manufacturer settings, thermal indicators, warning indicators, or combination thereof. One or more devices may be identified and prioritized for receiving a power charge via a wireless charging device according to one or more power charging parameters. A selected amount of the power charge may be provided to the one or more prioritized devices, via the wireless charging device, according to the one or more power charging parameters.

Figure 4:
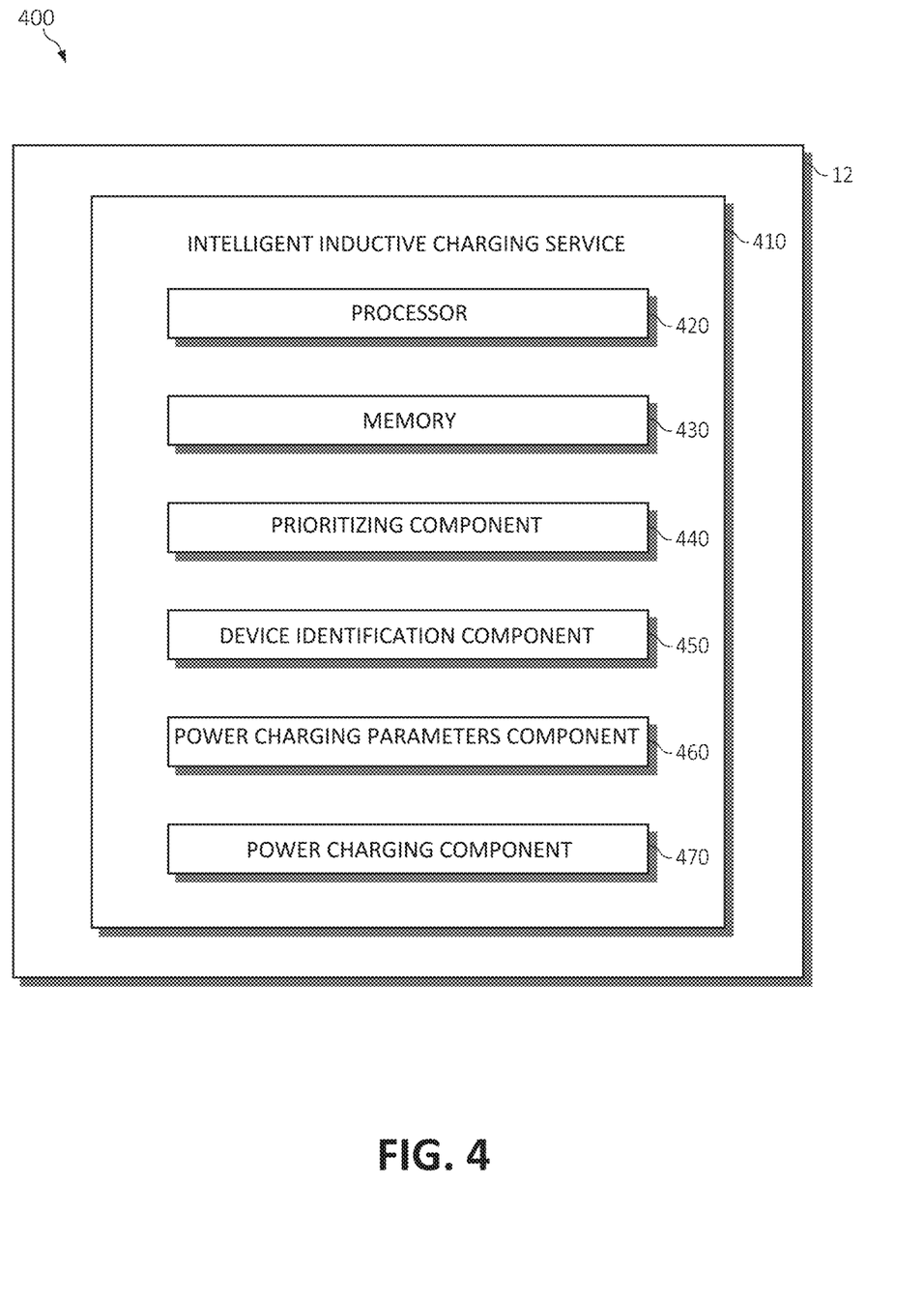
FIG. 4 is an additional block diagram for intelligent inductive charging of multiple devices based on power preferences according to an embodiment of the present invention.

Turning now to FIG. 4, a block diagram depicting exemplary functional components 400 according to various mechanisms of the illustrated embodiments is shown. FIG. 4 illustrates an intelligent inductive charging service in a computing environment, such as an intelligent inductive charging service 410 that may be included in a computing environment, according to an example of the present technology. As will be seen, many of the functional blocks may also be considered "modules" or "components" of functionality, in the same descriptive sense as has been previously described in FIGS. 1-3. With the foregoing in mind, the module/component blocks 400 may also be incorporated into various hardware and software components of a system for intelligent scheduling of events in accordance with the present invention. Many of the functional blocks 400 may execute as background processes on various components, either in distributed computing components, or on the user device, or elsewhere.

The system 400 may include the computing environment such as, for example, an intelligent inductive charging service 410. In one aspect, the intelligent inductive charging service 410 may include a processing unit ("processor") 420 to perform various computational, data processing and other functionality in accordance with various aspects of the present invention. The intelligent inductive charging service 410 may be provided by the computer system/server 12 of FIG. 1. The processing unit 420 may be in communication with memory 430.

In one aspect, the intelligent inductive charging service 410 be included in a computing system that provides virtualized computing services (i.e., virtualized computing, virtualized storage, virtualized networking, etc.). More specifically, the intelligent inductive charging service 410 may be included in a computing system that provides virtualized computing, virtualized storage, virtualized networking and other virtualized services that are executing on a hardware substrate.

The intelligent inductive charging service 410 may include a prioritizing component 440, a device identification ("ID") component 450, a power charging parameters component 460, and a power charging component 470.

In one aspect, the device ID component 450 may identify one or more devices associated with a wireless charging device such as, for example, a wireless charging table/station.

The power charging parameters component 460 may monitor, learn, and/or define one or more power charging parameters according to a usage history of each device, user behavior, power consumption of each device, power requirements of each device, interaction between one or more users, one or more environmental factors, or combination thereof. In one aspect, the power charging parameters component 460 may continuously and dynamically adjust the one or more power charging parameters for prioritizing the one or more devices.

The prioritizing component 440 may prioritize one or more identified devices (identified by the device ID component 450, for receiving a power charge via a wireless charging device according to one or more power charging parameters.

The power charging component 470 may also provide, direct, or route a selected amount of the power charge to the one or more prioritized devices, via a wireless charging device, according to the one or more power charging parameters. The power charging component 470 may also direct the selected amount of the power charge to the one or more prioritized devices located on a pressure sensing layer of the wireless charging device (e.g., a wireless power charging table/station). That is, the power charging component 470 may selectively route all or a partial amount of the power charge from one or more non-prioritized devices to the one or more prioritized devices via the wireless charging device. The power charging component 470 may also reduce or eliminate an amount of power charge to non-prioritized devices associated with the wireless charging device.

Figure 5:
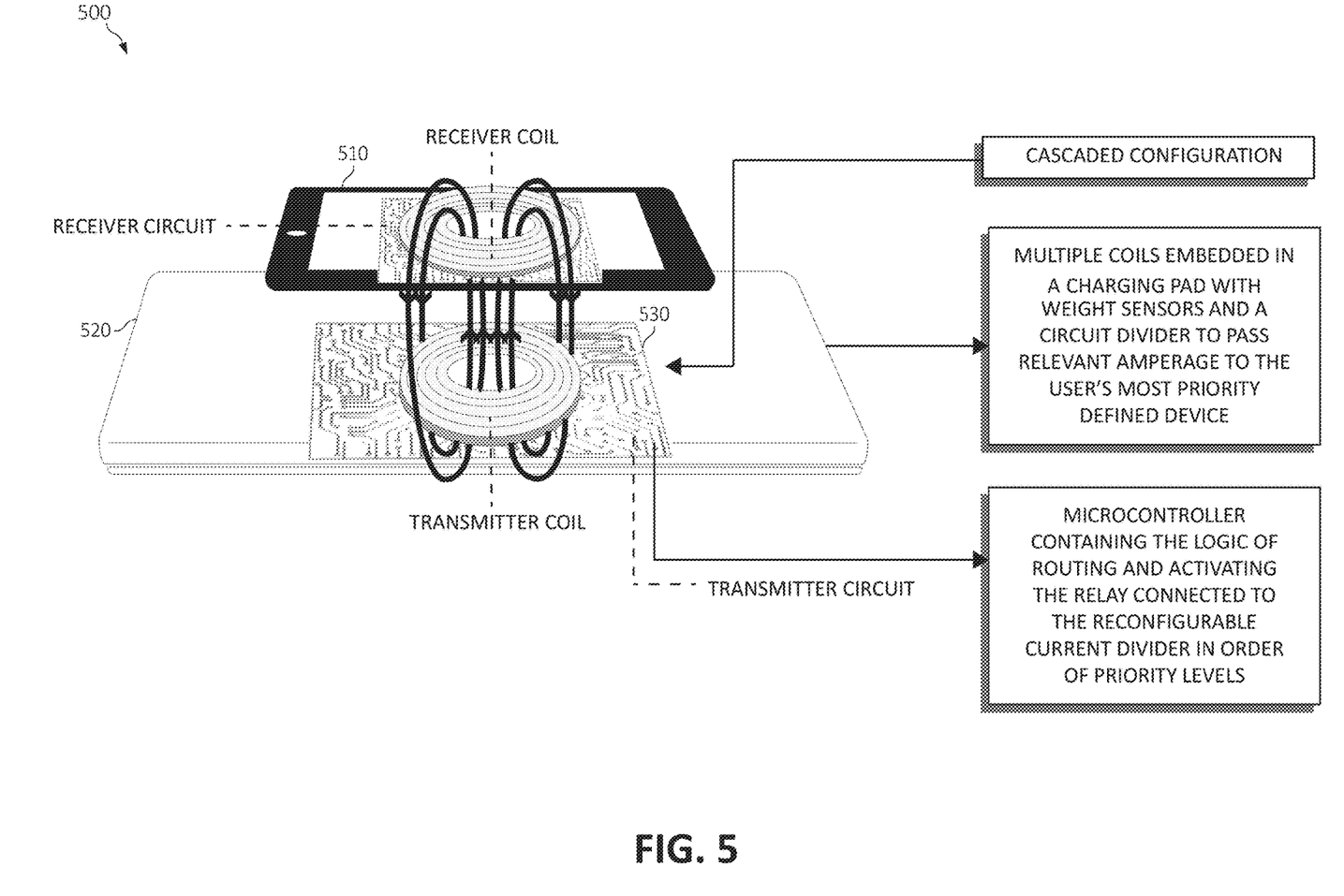
FIG. 5 is an additional block diagram depicting system architecture for inductive charging of multiple devices based on power preferences according to an embodiment of the present invention.

Turning now to FIG. 5, a block diagram depicts system architecture for inductive charging of multiple devices based on power preferences in a computing environment. The various functions, components, and descriptions of FIGS. 1-4 may be included in FIG. 5. More specifically, FIG. 5 depicts system architecture such as, for example, a wireless charging device 520 having a micro-controller 530 containing the logic of routing and activating a relay connected to a reconfigurable current divider circuit in order of priority levels. In one aspect, multiple coils (e.g., transmitter coils) may be embedded in the wireless charging device 520 (e.g., charging pad/table)) having one or more weight sensors (described in more detail of FIG. 6) and a circuit divider to pass relevant amperage to a prioritized device (e.g., a user's most priority defined device).

That is, the wireless charging device 520 (e.g., a wireless charging pad/table) may include a circuit cascaded and connected to a central micro-controller 530 with the priority logic of directing an electrical current to a most priority-based device such as, for example, device 510 and relatively lesser power being parsed to a device of lower priority (not shown for illustrative convenience).

The micro-controller 530 may be connected to a relay connected next to one or more inductive/resonant coils (e.g., transmitter coils of the circuit in the micro-controller 530 and receiver coils of receiver circuit on device 510) placed in parallel to each other. The parallel coils in the micro-controller 530 may be arranged in parallel to each other with various amplification levels (e.g., with assistance of multiple transistors for increasing a field-effect transistor ("FET") transistor current amplification. One or more weight sensors may be included in and/or connected to one or more analog inputs of the micro-controller 530, which may be configured with current amplifiers and relays to activate/deactivate the amplification levels of one or more parallel circuits connected to the controller. The weights of the respective devices such as, for example, device 510 may be mapped to the current demands in order to pass the necessary amperage to the devices such as, for example, device 510 based on priority set by the user. The current may be a re-configurable current divider circuit and may be connected to inductive and resonant coils placed inside the wireless charging device (e.g., wireless charging pad/table) in order to route the maximum current to the most probable device. The reconfigurable connection may be created using relay-based field-programmable gate arrays ("FPGAs") to pass the current to the relevant device such as, for example, device 510 based on user's priority, battery life and usage of the respective device.

In one aspect, the micro-controller 530 may include a configurable pressure sensing layer. The micro-controller 530 may selectively turn inductive coils on and off based on the pressure sensor layer. The micro-controller 530 may include a feedback loop to identify current charge capacity and demand for one or more devices. The micro-controller 530 may direct current to an identified computing device according to priority.

With the foregoing functional components 400 and 500 in view, consider the following wireless power charging steps/operations. Step 1) a main voltage may be converted into high frequency alternating current (AC). Step 2) the AC may be sent to the transmitter coil by the transmitter circuit. The alternating current then induces a time varying magnetic field in the transmitter coil. Step 3) AC flowing within the transmitter coil induces a magnetic field, which may extend to the receiver coil (when within a specified distance). In step 4) the magnetic field generates a current within the receiver coil of the device 510. The process whereby energy is transmitted between the transmitter and receiver coil is also referred to as magnetic or resonant coupling and is achieved by both coils resonating at the same frequency. In step 5), the current flowing within the receiver coil is converted into direct current (DC) by the receiver circuit of device 510, which can then be used to wirelessly charge a battery of device 510.

The current divider circuit may be combined in a cascaded format with a relay-based FPGA circuit. The micro-controller 530 may have priority in order to trigger the maximum current through the most probable device according to one or more power charging parameters. In an additional embodiment, the same reconfiguration can be established with a multiplexer (e.g., 2 select inputs and 4 output modes for selection of most probable device switching) for routing the maximum amperage to the most probable device.

Figure 6:
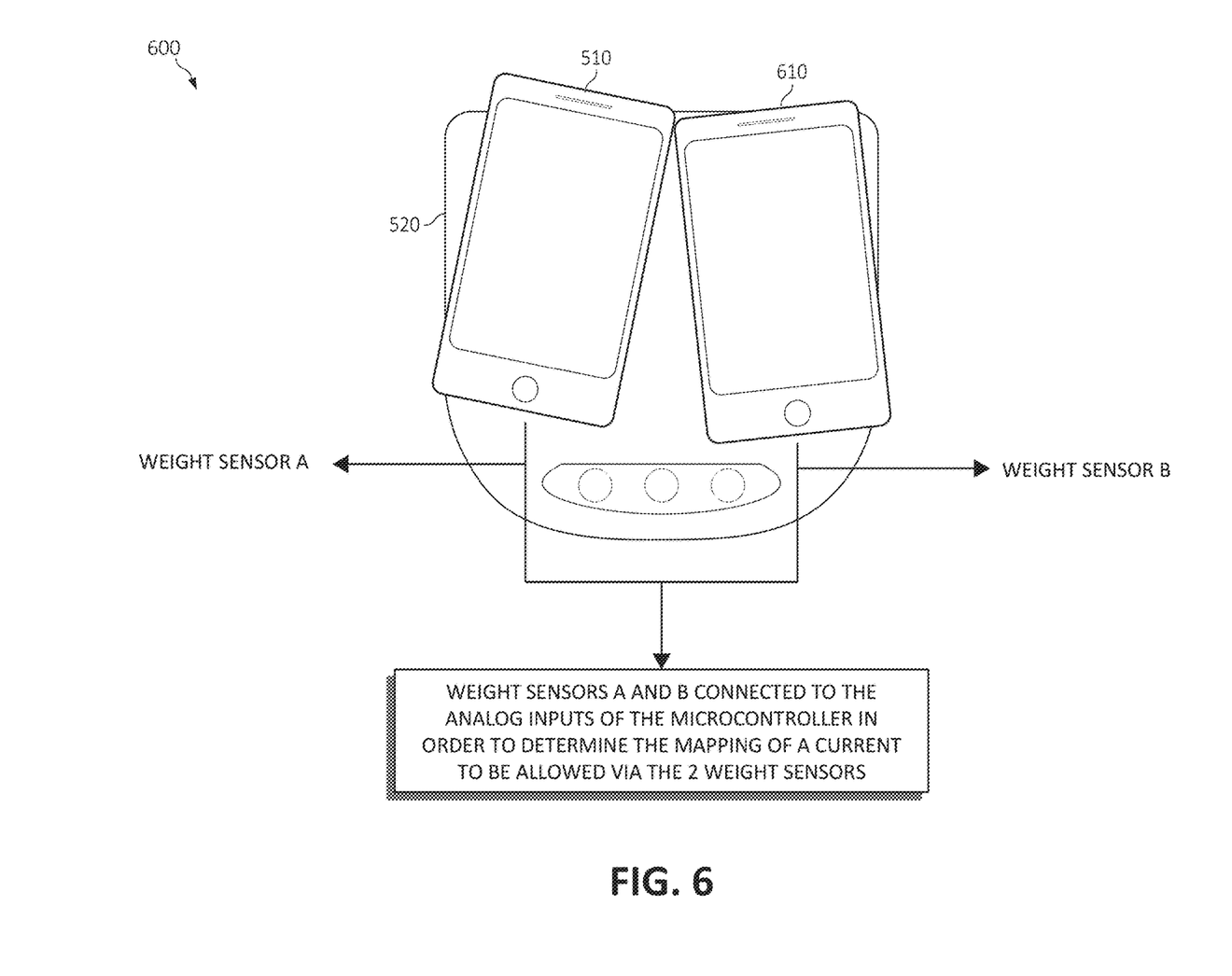
FIG. 6 is an additional block diagram depicting mapping of weighted factors to priority levels for inductive charging of multiple devices based on power preferences in which aspects of the present invention may be realized.

FIG. 6 is an additional block diagram 600 depicting a mapping of weighted factors to priority levels for inductive charging of multiple devices based on power preferences. The various functions, components, and descriptions of FIGS. 1-5 may be included in FIG. 6. In one aspect, FIG. 6 highlights the mapping of the weighted factors to the priority levels as defined in the micro-controller such as, for example, micro-controller 530 of FIG. 5 in order to direct the correct amperage through the induction coils cascaded in a charging pad such as, for example, wireless charging device 520.

As depicted, weight sensor A and weight sensor B may be included in the micro-controller 530. That is, the weight sensor A and weight sensor B may be connected to analog inputs of the micro-controller 530 in order to determine a mapping of the current to be allowed via the weight sensor A and weight sensor B for device 510 (of FIG. 5) and/or device 610. That is, weight sensor A and weight sensor B may be connected to the analog inputs and act as internal inputs to the micro-controller 530, which assists in deciding the most prioritized device (either device 510, 610 or both device 510 and 610 and activating the correct induction coil. That is, the micro-controller 530 of FIG. 5 may include a configurable RFID. The micro-controller 530 may selectively turn inductive coils on and off based on the RFID tag.

Figure 7:
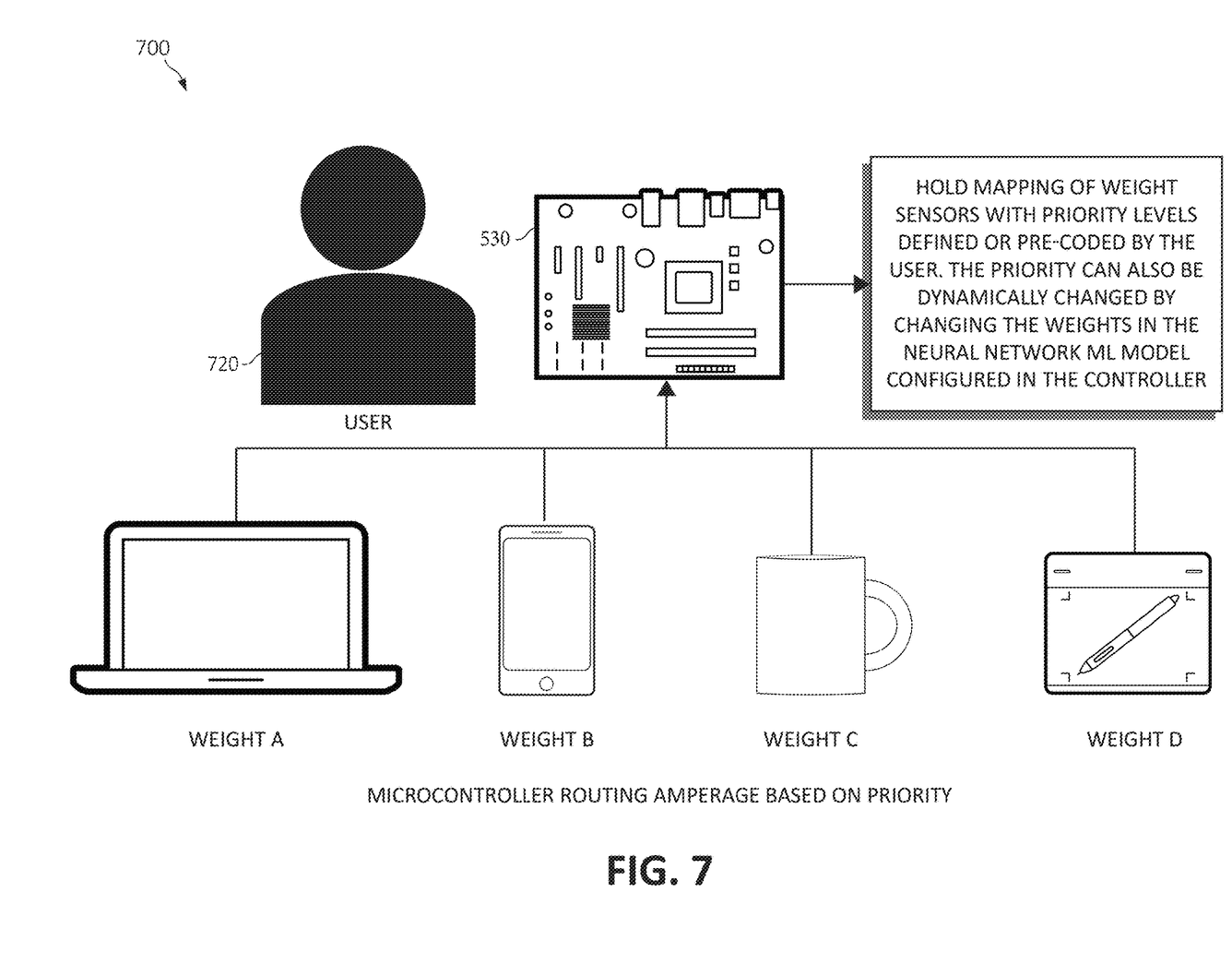
FIG. 7 is an additional block diagram depicting inductive charging of multiple devices, based on power preferences, located on a wireless charging station in which aspects of the present invention may be realized.

Turning now to FIG. 7, block diagram 700 depicts inductive charging of multiple devices, based on power preferences, located on a wireless charging station, which may include a micro-controller such as, for example, micro-controller 530 of FIG. 5. The various functions, components, and descriptions of FIGS. 1-6 may be included in FIG. 6.

FIG. 7 depicts the application of multiple devices on top of a wireless charging device (e.g., a charging pad), which covers, for example, an entire table. That is, the multiple devices may be located on weight A, weight B, weight C, and/or weight D. The induction coils of the wireless charging device (e.g., wireless charging device 520 of FIG. 5 that may include micro-controller 530) may be spread across with a FPGA and a relay-based circuit with routing of a selected amount of power dependent on a central micro-controller such as, for example, micro-controller 530 of FIG. 5 that may assign an accurate and/or selected amount of amperage to one of the devices based on one or more power charging parameters (e.g., weight and/or user defined parameters). In one aspect, in addition to or alternatively to the weight sensors, one or more RFID tags may be placed on one or more various sections of the wireless charging station (e.g., wireless charging table) to recognize and identify a matching RFID tag with a respective device and accordingly, maximum amperage can be routed or directed to the most probable device and relatively lesser to the low priority devices. The micro-controller 530 may hold a mapping of weight sensors with priority levels that may be defined or pre-coded by a user. The priority levels may be dynamically changed by changing the weights in a neural network machine learning ("ML") model configured in the micro-controller 530.

In short, the sensing of one devices may be derived from an application and may utilize Bluetooth, Wi-Fi, near-field communication ("NFC"), and other wireless communication protocols, and certain operations such as, for example, a cycling of a coil to indicate where the device is located. For example, instead of using weight, when a device is placed on a power matt, a coil may be triggered on and off in rapid succession, similar to the operations of Transmission Control Protocol (TCP) and the Internet Protocol (IP) ("TCP/IP"), to identify the location of the device and seek a response from the device. Such operations of sensing the device may be similar to a SYN and then awaits for an ACK before powering on with SYN. (It should be noted, for illustration purposes only, that a TCP may be a three-way handshake operation and referred to as "SYN-SYN-ACK" (or more accurately SYN, SYN-ACK, ACK) because there are three messages transmitted by TCP to negotiate and start a TCP session between two computers.) Thus, use of weight for sensing a device, as illustrated herein, is merely one embodiment for sensing location of a device upon the power matt. Accordingly, one or more types of operations may be used for sensing the device on a power matter such as, for example, an IoT devices having a component for power management and the power management component may be able to communicate to a charge assembly.

Figure 8:
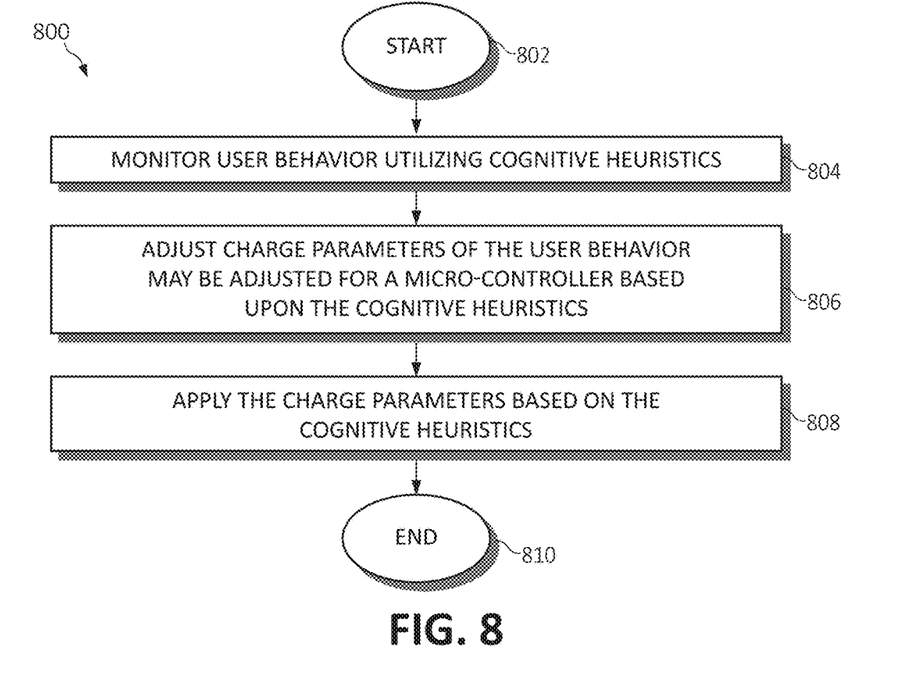
FIG. 8 is a flowchart diagram depicting an additional exemplary method for inductive charging multiple devices in which aspects of the present invention may be realized.

Turning now to FIG. 8, a method 800 for inductive charging multiple devices in a computing environment is depicted, in which various aspects of the illustrated embodiments may be implemented. The functionality 800 may be implemented as a method executed as instructions on a machine, where the instructions are included on at least one computer readable medium or on a non-transitory machine-readable storage medium.

The functionality 800 may start in block 802. User behavior (e.g., user behavior relating to one or more computing devices) may be monitored utilizing one or more cognitive heuristics, as in block 804. Power charge parameters of the user behavior may be adjusted for a micro-controller based upon the cognitive heuristics, as in block 806. The charge parameters may be applied (for charging a battery of a computing device) based on the cognitive heuristics, as in block 808. The functionality 800 may end in block 810.

Figure 9:
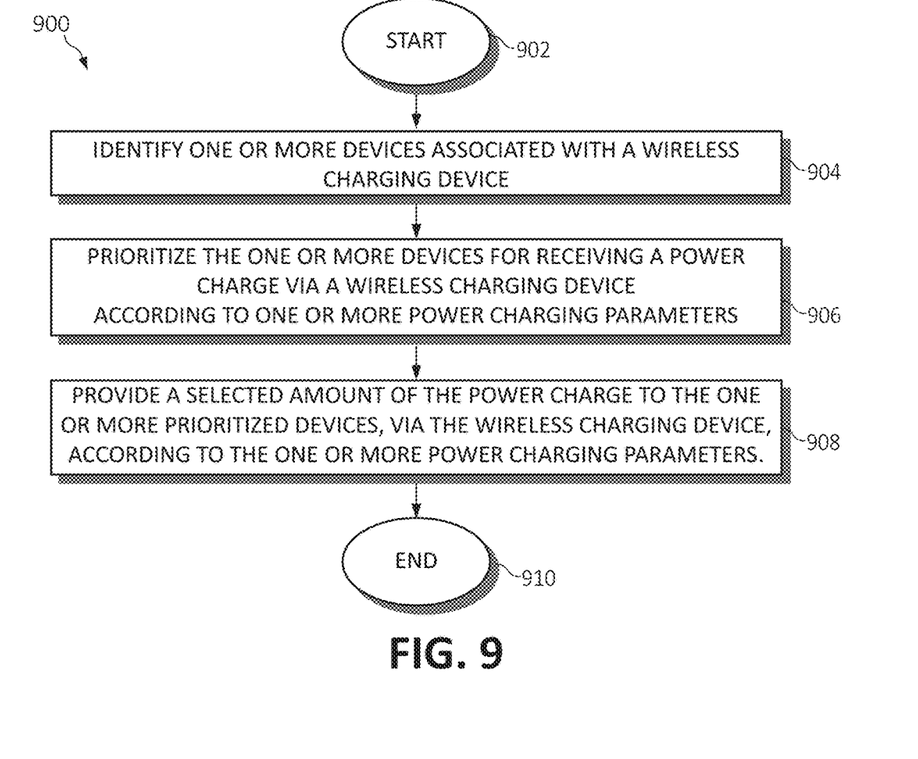
FIG. 9 is an additional flowchart diagram depicting an additional exemplary method for inductive charging multiple devices in a computing environment by a processor, again in which aspects of the present invention may be realized.

Turning now to FIG. 9, a method 900 for inductive charging multiple devices in a computing environment is depicted, in which various aspects of the illustrated embodiments may be implemented. The functionality 900 may be implemented as a method executed as instructions on a machine, where the instructions are included on at least one computer readable medium or on a non-transitory machine-readable storage medium.

The functionality 900 may start in block 902. One or more devices associated with a wireless charging device (e.g., a wireless charging table/station) may be identified, as in block 904. One or more devices (that have been identified) may be prioritized for receiving a power charge via a wireless charging device according to one or more power charging parameters, as in block 906. A selected amount of the power charge may be provided to the one or more prioritized devices, via the wireless charging device, according to the one or more power charging parameters, as in block 908. The functionality 900 may end in block 910.

In one aspect, in conjunction with and/or as part of at least one block of FIGS. 8-9, the operations of methods 800 and 900 may include each of the following. The operations of methods 800 and 900 may identify the one or more devices associated with the wireless charging device. The power charging parameters may include and/or be defined as a usage history of each device, user behavior, power consumption of each device, power requirements of each device, interaction between one or more users, one or more environmental factors, or combination thereof.

The operations of methods 800 and 900 may further dynamically adjust the one or more power charging parameters for prioritizing the one or more devices. The selected amount of the power charge may be directed to the one or more prioritized devices located on a pressure sensing layer of the wireless charging device, wherein the wireless charging device is a wireless power charging table. Moreover, the selected amount of the power charge may be selectively routed from one or more non-prioritized devices to the one or more prioritized devices via the wireless charging device. The operations of methods 800 and 900 may further reduce or eliminate an amount of power charge to non-prioritized devices associated with the wireless charging device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method, by a processor, for intelligent inductive charging of multiple devices in a computing environment, comprising:
    prioritizing one or more devices for receiving a power charge via a wireless charging device according to one or more power charging parameters;
    providing a selected amount of the power charge to the one or more prioritized devices, via the wireless charging device, according to the one or more power charging parameters;
    directing the selected amount of the power charge to the one or more prioritized devices located on a pressure sensing layer of the wireless charging device, wherein the pressure sensing layer includes one or more weight sensors; and
    detecting the one or more prioritized devices respective to one or more non-prioritized devices according to a weight of each of the one or more prioritized devices as identified by the one or more weight sensors, wherein the weight of each of the one or more prioritized devices is mapped to a current demand associated with the respective one or more prioritized devices according to the one or more power charging parameters.

2. The method of claim 1, further including identifying the one or more devices associated with the wireless charging device.

3. The method of claim 1, further including defining the one or more power charging parameters according to a usage history of each device, user behavior, power consumption of each device, power requirements of each device, interaction between one or more users, one or more environmental factors, manufacturer settings, warning indicators, or combination thereof.

4. The method of claim 1, further including dynamically adjusting the one or more power charging parameters for prioritizing the one or more devices.

5. The method of claim 1, wherein the wireless charging device is a wireless power charging table.

6. The method of claim 1, further including selectively routing the selected amount of the power charge from the one or more non-prioritized devices to the one or more prioritized devices via the wireless charging device.

7. The method of claim 1, further including reducing or eliminating an amount of power charge to the one or more non-prioritized devices associated with the wireless charging device.

8. A system for intelligent inductive charging of multiple devices in a computing environment, comprising:
    one or more computers with executable instructions that when executed cause the system to:
        prioritize one or more devices for receiving a power charge via a wireless charging device according to one or more power charging parameters;
        provide a selected amount of the power charge to the one or more prioritized devices, via the wireless charging device, according to the one or more power charging parameters;
        direct the selected amount of the power charge to the one or more prioritized devices located on a pressure sensing layer of the wireless charging device, wherein the pressure sensing layer includes one or more weight sensors; and
        detect the one or more prioritized devices respective to one or more non-prioritized devices according to a weight of each of the one or more prioritized devices as identified by the one or more weight sensors, wherein the weight of each of the one or more prioritized devices is mapped to a current demand associated with the respective one or more prioritized devices according to the one or more power charging parameters.

9. The system of claim 8, wherein the executable instructions further identify the one or more devices associated with the wireless charging device.

10. The system of claim 8, wherein the executable instructions further define the one or more power charging parameters according to a usage history of each device, user behavior, power consumption of each device, power requirements of each device, interaction between one or more users, one or more environmental factors, or combination thereof.

11. The system of claim 8, wherein the executable instructions further dynamically adjust the one or more power charging parameters for prioritizing the one or more devices.

12. The system of claim 8, wherein the wireless charging device is a wireless power charging table.

13. The system of claim 8, wherein the executable instructions further selectively route the selected amount of the power charge from the one or more non-prioritized devices to the one or more prioritized devices via the wireless charging device.

14. The system of claim 8, wherein the executable instructions further reduce or eliminate an amount of power charge to the one or more non-prioritized devices associated with the wireless charging device.

15. A computer program product for intelligent inductive charging of multiple devices in a computing environment by a processor, the computer program product comprising a non-transitory computer-readable storage medium having computer-readable program code portions stored therein, the computer-readable program code portions comprising:
    a first executable portion that prioritizes one or more devices for receiving a power charge via a wireless charging device according to one or more power charging parameters;
    a second executable portion that provides a selected amount of the power charge to the one or more prioritized devices, via the wireless charging device, according to the one or more power charging parameters;
    a third executable portion that directs the selected amount of the power charge to the one or more prioritized devices located on a pressure sensing layer of the wireless charging device, wherein the pressure sensing layer includes one or more weight sensors; and
    a fourth executable portion that detects the one or more prioritized devices respective to one or more non-prioritized devices according to a weight of each of the one or more prioritized devices as identified by the one or more weight sensors, wherein the weight of each of the one or more prioritized devices is mapped to a current demand associated with the respective one or more prioritized devices according to the one or more power charging parameters.

16. The computer program product of claim 15, further including a fifth executable portion that identify the one or more devices associated with the wireless charging device.

17. The computer program product of claim 15, further including a fifth executable portion that defines the one or more power charging parameters according to a usage history of each device, user behavior, power consumption of each device, power requirements of each device, interaction between one or more users, one or more environmental factors, or combination thereof.

18. The computer program product of claim 15, further including a fifth executable portion that dynamically adjust the one or more power charging parameters for prioritizing the one or more devices.

19. The computer program product of claim 15, wherein the wireless charging device is a wireless power charging table.

20. The computer program product of claim 15, further including a fifth executable portion that:
  selectively routes the selected amount of the power charge from the one or more non-prioritized devices to the one or more prioritized devices via the wireless charging device; or
  reduces or eliminates an amount of power charge to the one or more non-prioritized devices associated with the wireless charging device.

* * * * *